Jan. 15, 1924.
E. P. BONE
MOTOR VEHICLE HEADLAMP
Filed Dec. 20, 1920
1,480,803
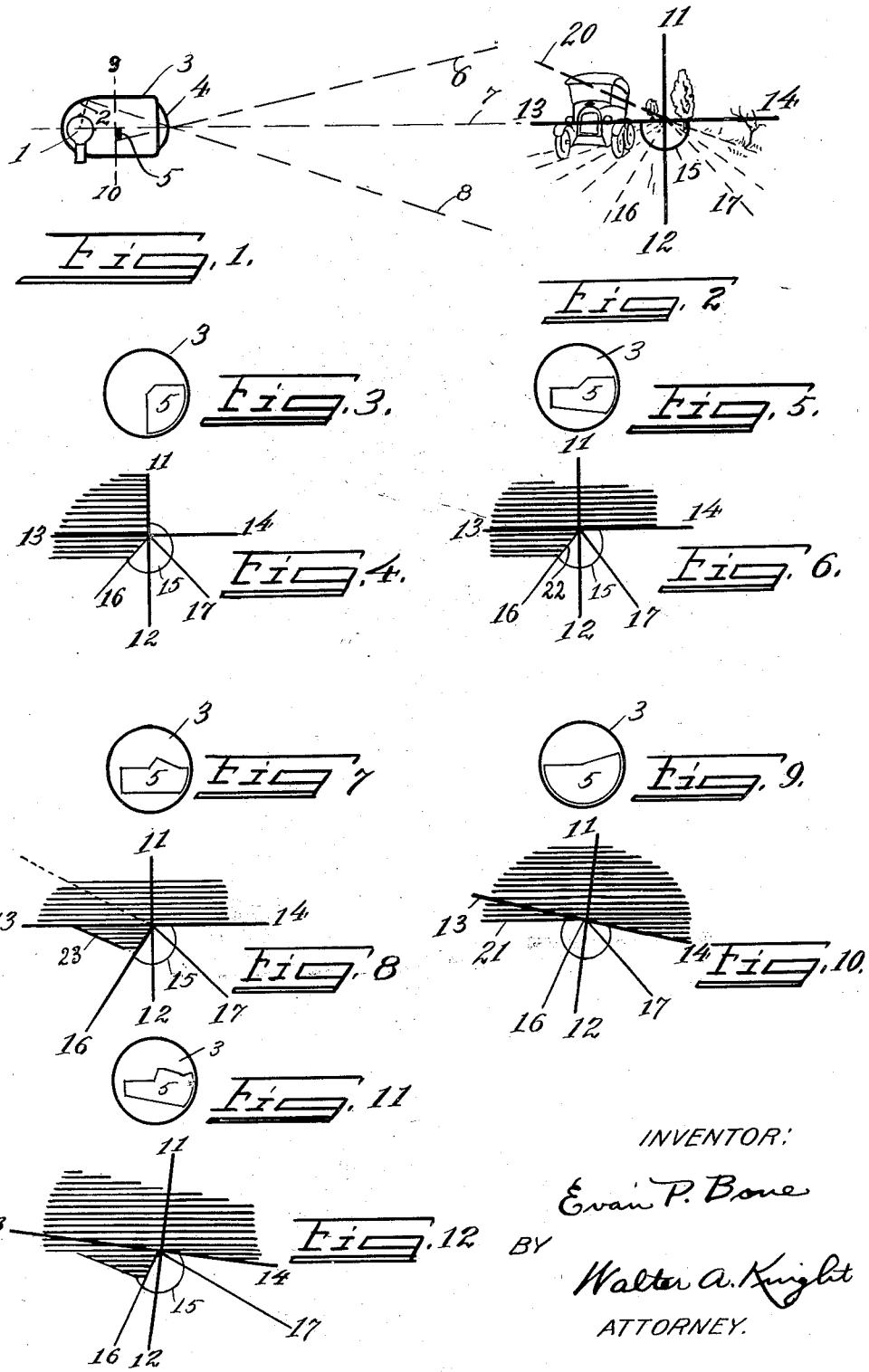

Patented Jan. 15, 1924.

1,480,803

UNITED STATES PATENT OFFICE.

EVAN P. BONE, OF CINCINNATI, OHIO.

MOTOR-VEHICLE HEADLAMP.

Application filed December 20, 1920. Serial No. 432,018.

*To all whom it may concern:*

Be it known that I, EVAN P. BONE, a citizen of the United States, residing at Cincinnati, in the county of Hamilton and State of Ohio, have invented new and useful Improvements in Motor-Vehicle Headlamps, of which the following is a specification.

My invention relates to improvements in the intercepting means of the type of lamp as disclosed in my co-pending application filed January 8th, 1920, Serial Number 350,073, issued as Patent No. 1,389,291.

The object of the present invention is to provide means for increasing the surety of illuminating the road without causing glare, under varying road conditions.

In my said patent means are provided for applying the optical principle of real image projection for brilliantly illuminating the roadway at long range and at the same time preventing glare in the eyes of opposing drivers. This result is accomplished by projecting a sharply defined dark area or shadow over the upper portion of the field, the usual elevation of the eyes of opposing drivers, and particularly at the left, in the position which the opposing driver takes in passing. There are, however, exceptional occasions with this arrangement on rough roads, hills, curves, etc., when the body of the vehicle is tilted to flash the glaring beam into the eyes or, on the other hand, when the dark shadow is lowered to the roadway, limiting the distance ahead at which the driver may see. It is for the purpose of decreasing the number of these latter circumstances that the improvements of the present invention are intended.

My invention is illustrated in the accompanying drawings in which

Fig. 1 is a diagrammatic longitudinal sectional view of a suitable headlamp showing the location of the screen of the present invention and its relation to the field of illumination.

Fig. 2 is a diagrammatic perspective view of the field of illumination as viewed from behind the lamp.

Figs. 3, 5, 7, 9 and 11 are cross sections of the lamp on planes 9—10 of Fig. 1 viewed from the rear showing some of the various types of screens covered by this invention.

Figs. 4, 6, 8, 10 and 12 are diagrammatic perspective views of the fields of illumination produced by the next preceding numbered figures respectively, Fig. 4 corresponding to Figs. 3 and 6 to 5, etc.

Referring to Figure 1, the light radiating from the source 1, to the reflector 2, is thence directed thru the plane 9—10 to the lens 4 and projected into the field of illumination. The plane 9—10 is the focal plane of the lens 4 and an image of whatever object is located in plane 9—10 is reproduced by the lens, in accordance with well known laws of optics. Having an intercepting means or screen 5, located in the focal plane as shown, its image, as a shadow, will appear on any objects within the lines 6 and 7 at practicable distances in front of the lamp. The shape and location of this screen 5 in the focus of the lens, in relation to the axis of the beam of light, regulates the dark and light portions of the field; for instance, if the eyes are located in the shadow within the lines 6 and 7 there is no glare, while, if the roadway is located within the lines 7 and 8, it receives full illumination from the lamp. The regulation between light and dark may be horizontal as well as vertical.

The general field of illumination as shown in Figure 2 naturally divides, for the purposes of illumination, into four quadrants bounded by the lines 11—12 and 13—14. The line 11—12 represents a meridian or vertical plane thru the lamp and 13—14 a plane at right angles thereto.

Under normal conditions of level road the plane 13—14 is on the level of the lamp and the eyes of opposing drivers would be in one of the two upper quadrants. When the opposing driver turns aside to pass, into a position to the left of 11—12, his eyes are in the upper left quadrant, within the angle formed by the lines 11 and 13. Therefore, to avoid glare under normal conditions, the portion of the field above 13—14 should be in shadow, it being, however, of more importance to have the upper left quadrant in shadow because this is the position of the eyes of the opposing driver when he approaches within close range and a glaring light would become most intense. To provide illumination at long range, portions of the field just below 13—14 should be in full light and it is of more importance to have the lower right quadrant illuminated on account of the turning aside to the right of the road to pass.

Whenever the vehicle having headlamps equipped with such screens goes over the crest of a hill or the lamps are tilted upwardly from spring action on rough roads or from abnormal loading, the plane 13—14 rises above the level and may bring the eyes of the opposing driver into the lower left quadrant in passing. In order to avoid glare under these circumstances means may be provided to extend the darkened area into this quadrant. The extension of the shadow into the lower left quadrant, however, is preferably limited so as to allow some close range illumination for the left of the roadway and for left turns.

The shaded area on the diagrams of the field of illumination represent the shadows. The circle 15 of the figures represents the area of brightest illumination, it being preferable to have the brightest illumination at the intersection of the planes 11—12 and 13—14 in order that the roadway may have adequate illumination at long range and in the center of straight roads. The lines 16 and 17 represent the normal wheel tracks ahead, the same, on account of the perspective, appearing to narrow toward the vanishing point as the distance ahead increases.

Figure 3 shows a type of screen to illuminate the field as shown in Figure 4. The upper left quadrant is darkened with a shadow portion extending only partially into the lower left quadrant, thus providing illumination on the right for all conditions of hills and tilting, with illumination a moderate distance ahead on the left for left turns but with no glare after turning to the left even if the lamp receives a considerable upward tilt or in going over a hill.

Figure 5 shows a type of screen to illuminate the field as shown in Figure 6. The shadow extending into the lower left quadrant has its right edge 22 beveled at such an angle that when directed to a straight road ahead, said beveled edge coincides with the track of the left wheel ahead, thus completely illuminating the portion of the roadway ahead which the vehicle is to travel. From the fact that the lamp as usually mounted on a vehicle is inside of the line of the left hand wheels, the perspective of the left track when projected back to the focal plane, converges to the vanishing point as shown and the bevel on the edge of the screen causes the effect desired.

Figure 7 shows a type of screen 5 to illuminate the roadway as shown on Figure 8. The shadow projecting into the lower left quadrant has its left edge 23 beveled as shown, thus permitting illumination at the left of the extended shadow for left turns etc., but serving to prevent glare from upward tilts. The dotted line 20 (also shown in Figure 2) represents the locus of the eyes of a passing driver when turned to the side. The position of the eyes being above the level of the lamp as well as to the left side, the locus, due to the perspective effect, extends upwardly as well as outwardly. By making the left lower edge 23, of the extended shadow, parallel with the locus of the eyes, it would require the same angle of upward tilt to cause glare in the eyes at all positions of passing.

Figure 9 shows a type of screen to illuminate the field as shown in Figure 10. The shadow extends into the lower left quadrant, having its lower edge at a slightly downward angle from the plane 13—14 with its apex at the center. Roadways are usually built with a crown in the center and when the vehicle having this lamp turns to the right, the left wheels are higher than the right, tilting the vehicle sidewise, in a position which puts the left of the plane 13—14 above the level, even on so called level roads. This downward angle 21, compensates for the crown and avoids glare.

Figure 11 shows a type of screen to illuminate the field as shown in Figure 12, having the features of both Figures 8 and 10.

It is not so important that the edges of the screens of the various types have accurate positions, except around the center near the bright part 15 of the beam, the area of the screens, determining the area of the shadows, may be such as to just cover the height of the eyes or to extend over the entire upper portion of the field as shown respectively in the various figures. In the figures pertaining particularly to the extension of the shutter into the lower left quadrant, the main portion of the shadow in the upper half of the field may cover either one or both quadrants.

The diagrams are shown with illumination as from only one lamp. When two lamps are used the shadows may overlap, but regulation as to preventing glare should apply to both lamps.

Having thus fully described my invention, what I claim as new and desire to secure by Letters Patent, is:

1. In combination with a headlamp provided with means for projecting a real image, a screen disposed substantially at an inner focus of said means, conjugate with a portion of the field of illumination in the upper half, with an extension into the lower half, said extension having an oblique edge.

2. In combination with a headlamp provided with means for projecting a real image, a screen disposed substantially at an inner focus of said means, conjugate with a portion of the field of illumination in the upper half, with an extension into a lower quadrant, said extension having its right edge sloping obliquely from its top toward the left.

3. In combination with a headlamp provided with a lens for projecting a real image, a screen disposed substantially at an inner focus of the lens conjugate with a portion of the field of illumination in the upper half, with an extension into the lower left quadrant, said extension having its right edge sloping obliquely from its top toward the left.

EVAN P. BONE.